United States Patent [19]

Craig et al.

[11] 4,377,301
[45] Mar. 22, 1983

[54] FUEL TANK FILLER PIPE RETAINER

[75] Inventors: Gordon L. Craig, Redford Township, Wayne County; Terry J. Cupp, Ypsilanti, both of Mich.

[73] Assignee: Ford Motor Company, Dearborn, Mich.

[21] Appl. No.: 280,183

[22] Filed: Jul. 6, 1981

[51] Int. Cl.³ ............................................. F16L 3/00
[52] U.S. Cl. ..................................... 285/62; 285/189; 285/DIG. 3; 248/56; 248/544
[58] Field of Search ................. 285/62, 61, DIG. 3, 285/189; 248/56, 544, 300

[56] References Cited

U.S. PATENT DOCUMENTS 2,143,177  1/1939  Whyte .......................... 285/302 X
3,029,406  4/1962  Huth .
3,176,257  3/1965  Introvigne .
3,989,394  11/1976  Ellis ........................ 285/DIG. 3 X Primary Examiner—Thomas F. Callaghan
Attorney, Agent, or Firm—Robert E. McCollum; Clifford L. Sadler

[57] ABSTRACT

A retainer for supporting and locating the fuel filler pipe relative to the fuel tank of a motor vehicle, the retainer having a keyway that cooperates with a bead on the filler pipe to deter axial separation once assembled, attachment of the retainer to the fuel tank pivoting the retainer against the pipe thereby resiliently clamping the pipe to the fuel tank.

4 Claims, 5 Drawing Figures

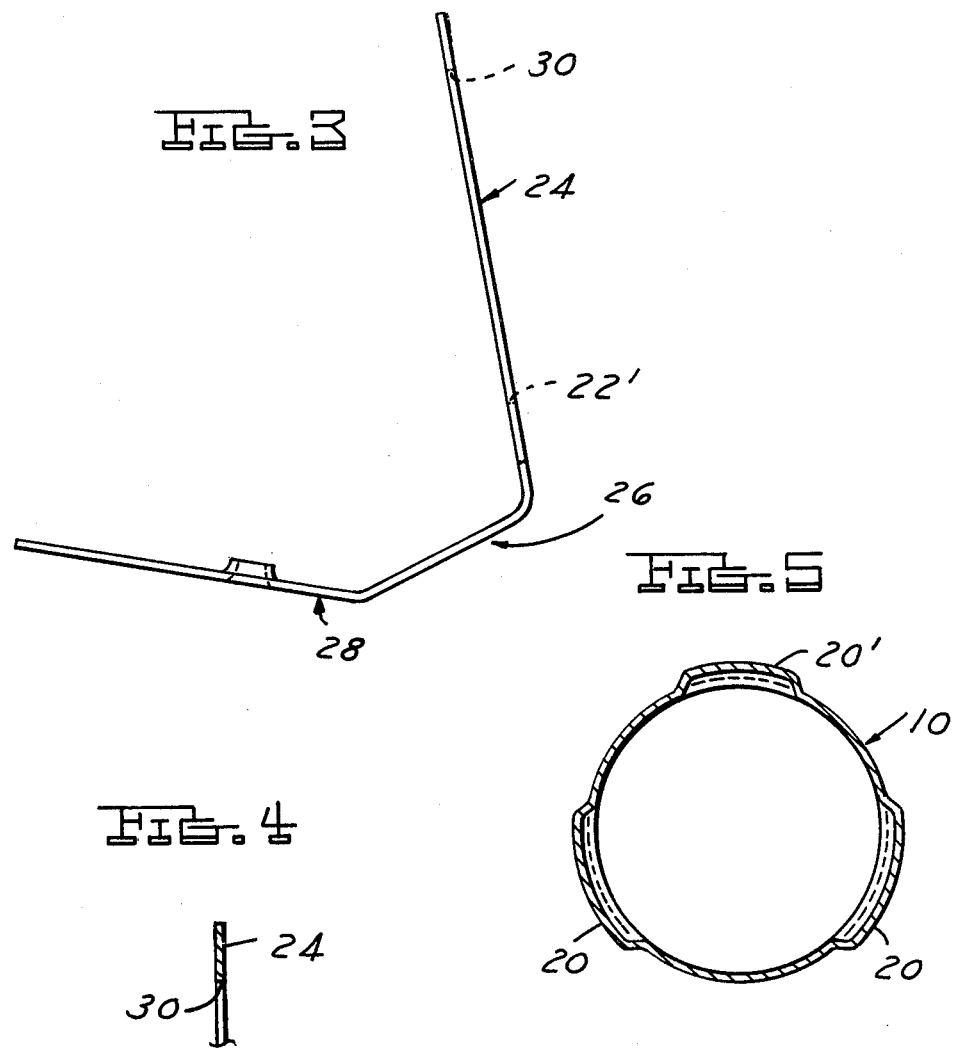

FUEL TANK FILLER PIPE RETAINER

This invention relates in general to the support of the fuel fill pipe for an automotive type fuel tank. More particularly, it relates to a retainer that resists fill pipe withdrawal as well as supports and locates the lower end of the fill pipe relative to the fuel tank.

In the past, the fuel fill pipe generally was inserted into the fuel tank through a resilient grommet or the like and a non-breakaway type connection provided at the opposite end where it was joined to the cap and the vehicle body. No particular retainer was provided near the lower end where the fuel pipe joined the tank.

This invention relates to a novel clamping type retainer for maintaining the lower portion of the fill pipe in position relative to the fuel tank. The retainer has a keyway that cooperates with beads on the fill pipe to permit insertion of the fuel fill pipe into the retainer while restricting withdrawal of the pipe after indexing of the keyway on the pipe. The retainer also resiliently clamps the fill pipe to the fuel tank mounting flange by tilting the retainer about the axis of the fill pipe during the attachment of the retainer to the fuel tank flange.

It is a primary object of the invention, therefore, to provide a retainer that resists separation of a fuel fill pipe from a fuel tank to which it is connected, while supporting and locating the fill pipe relative to the fuel tank.

It is a further object of the invention to provide a retainer of the type described above having a plurality of functions; namely, one that permits installing the pipe to the tank through a keyway of the retainer followed by an indexing of the keyway relative to the pipe to impede withdrawal of the pipe from the retainer, and a clamping of the retainer and pipe to the tank in a novel manner by angling the retainer relative to the pipe axis until the radial clearance between the keyway and pipe is eliminated.

Keyway and bayonet type connections for joining or retaining two members in position relative to one another are well-known in the prior art. For example, Huth, U.S. Pat. No. 3,029,406 shows such a connector for an electrical apparatus. Likewise, Introvigne, U.S. Pat. No. 3,176,257 shows an indexing type connector having a right angled support bracket. In Huth, however, there is no support bracket of the type described in connection with the invention; and, in Introvigne, the support bracket is not multi-purpose.

As stated above, the invention provides, firstly, a fuel fill pipe retainer that permits insertion of the pipe in one direction into the retainer while thereafter impeding separation of the two; and, secondly, a retainer that positively clamps the fill pipe to a portion of the fuel tank to resist longitudinal relative motion between the two.

Other objects, features and advantages of the invention will become more apparent upon reference to the succeeding, detailed description thereof, and to the drawings illustrating the preferred embodiment thereof; wherein, FIG. 1 is a cross-sectional view of a portion of a fuel tank filler pipe embodying the invention;

FIG. 3 is a separated view of a detail of FIG. 1; and,

Figure 1:
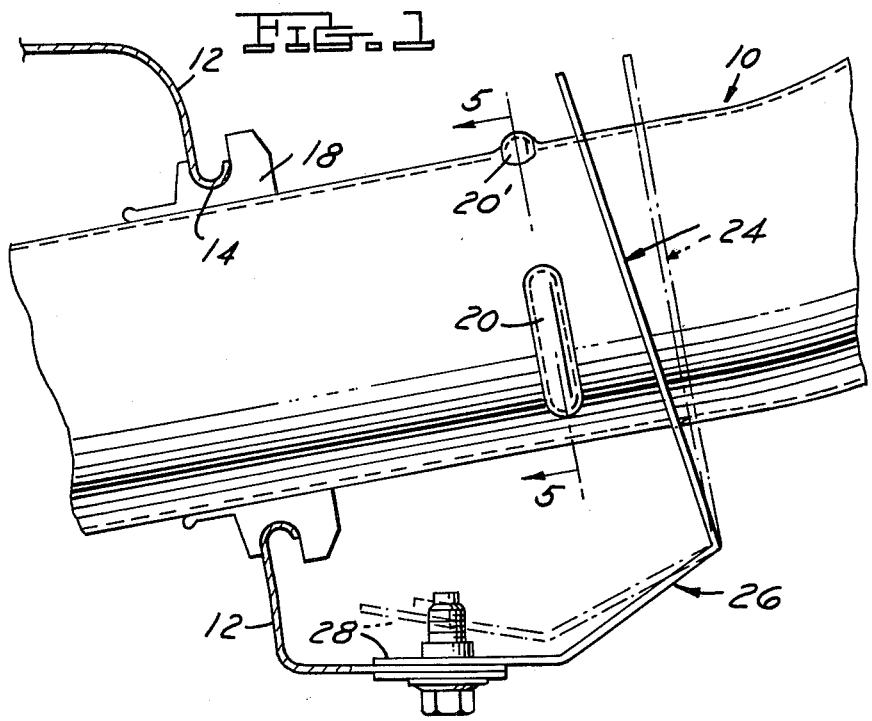
Figure 2:
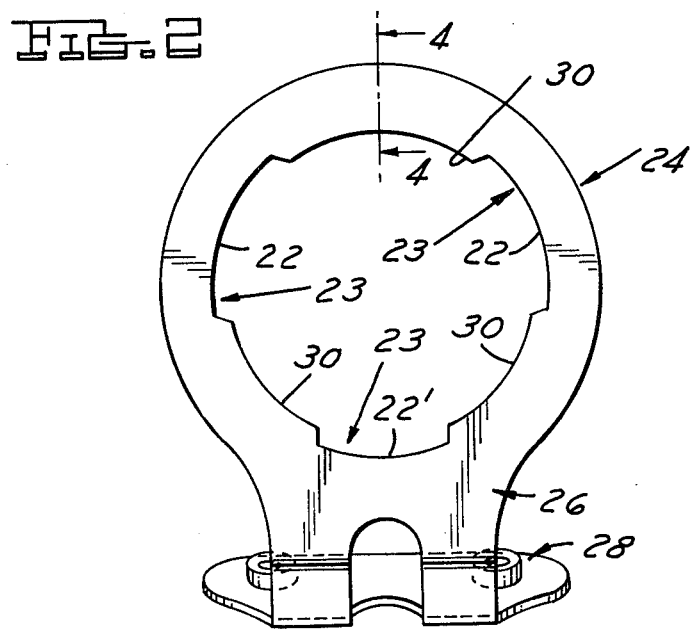
FIG. 2 is a front elevational view of the retainer illustrated in FIG. 1.

FIGS. 4 and 5 are cross-sectional views taken on planes indicated and viewed in the direction of the arrows 4—4 and 5—5 of FIGS. 2 and 1, respectively.

FIG. 1 shows a portion of a pipe 10 for relaying fuel from the conventional fuel pump nozzle to an automotive type fuel tank, not shown. The fuel tank in this case contains a mounting flange 12 having an opening 14 defined by a rolled over edge. The latter is located in the groove of a rubber grommet 18 through which is received the lower end of the fill pipe 10, as illustrated, to resiliently retain the fill pipe in location relative to the fuel tank.

The fill pipe is stamped to provide three equally circumferentially spaced upstanding beads 20, 20' projecting from the outer surface of the fill pipe. These beads are adapted to cooperate with three circumferentially spaced slots 22, 22' of a keyway 23 formed in one leg 24 of an essentially L-shaped bracket 26 constituting the retainer. The bead 20' on top of pipe 10 is of less circumferential extent than the remaining beads so that it must be axially aligned with a mating keyway slot 22' also of less circumferential extent than the other slots 22 before all the beads can pass freely through the keyway.

The retainer is defined by the one leg portion 24 and a second leg portion 28 that projects from the one at an angle other than a right-angle. In this case, the angle is less than 90°, although it will be clear later that, alternatively, it could be greater. The lower leg portion 28 constitutes a mounting flange for bolting to the support 12, as shown. The upper leg portion 24 contains an opening defining the keyway 23. As best seen in FIG. 2, three circumferentially and equally spaced portions 30 of a common diameter project axially into the opening to define the three keyway slots 22, 22' of a common greater diameter than the portions 30, as best seen in FIGS. 1 and 4.

Prior to bolting of the retainer bracket 26 to the fuel tank mounting flange 12, the bracket 26 first will be positioned rotated 180° from the position shown in dotted lines in FIG. 1 to axially align and match the beads 20, 20' with the corresponding width keyway slots 22, 22'. Also the longitudinal axis of leg portion 24 will be positioned at right angles to the longitudinal axis of fill pipe 10. This permits an insertion of the fill pipe and beads 20, 20' through the bracket openings 22, 22' because of the larger diameter of openings 22 than the outer diameter of beads 20. Rotation or indexing of the retainer 24 180° relative to the fuel pipe to the dotted line position shown in FIG. 1 then will axially misalign the larger radii opening 23 with the beads 20, 20' while aligning the lesser radii projecting portions 30 and the beads. Separation of the fill pipe from the retainer by relative movement between the two is then deterred in one direction at least.

Subsequent attachment of the lower leg flange portion 28 of retainer 26 to the fuel tank mounting flange 12 by bolts as shown in FIG. 1, will cause an arcuate tilting movement of retainer 26 and especially leg portion 24 to the full line position shown in FIG. 1 until the retainer is contiguous to pipe 10 over the entire inner diameter of the projecting tab portions 30. That is, any radial clearance that normally may exist between the fill pipe outer diameter and the inner diameter of the retainer when the retainer is in the first dotted line upright position at right angles to the axis of the fill pipe is eliminated and the inner diameter of the projecting portions 30 will be contiguous to and engage the outer diameter of the fill pipe 10. The retainer thus will resilient clamp the fill pipe in tension to the fuel tank mounting flange 12, eliminating vibration between the two and resisting separation of the pipe from the tank now at two points, at the grommet 18 and also at the retainer leg 24.

From the foregoing, it will be seen that the invention provides a multi-function retainer; i.e., one that provides for an initial mounting of the fill pipe into the fuel tank with means to deter axial separation of the two; and secondly, provides a resilient clamping action of the fuel pipe relative to the fuel tank when the retainer is assembled to the fuel tank mounting flange, this latter action being effected by a pivoting of the retainer until its inner diameter engages the outer diameter of the fill pipe.

While the invention has been shown and described in its preferred embodiment, it will be clear to those skilled in the arts to which it pertains that many changes and modifications may be made thereto without departing from the scope of the invention.

We claim:

1. A retainer for the fill pipe of a motor vehicle type fuel tank, the fill pipe having an upstanding bead projecting from its outer diameter, the retainer comprising: an essentially L-shaped bracket having first and second leg portions extending from each other at an angle other than a right angle, the first leg portion defining a mounting flange adapted to be secured to a portion of a fuel tank, the second leg portion having a keyway opening of a diameter large enough to receive the fuel fill pipe and bead therethrough in an axial sliding manner in one direction during assembly of the fuel pipe to the tank when the bead and opening are axially aligned and when the axis of the second leg portion of the bracket is positioned upright in a first position essentially at right angles to the longitudinal axis of the fill pipe, while impeding return movement of the fill pipe bead in the opposite direction past the bracket when the bracket mounting flange is rotated to axially misalign the bead and opening and fixedly secured to the portion of the fuel tank, the fixedly securing of the flange effecting a pivotal moving of the second leg portion arcuately from the first position at right angles to the pipe longitudinal axis to a second non-right angle position to clamp the edge of the bracket defining the opening against the outer diameter of the pipe and therefore reduce the radius of any portion of the edge from the axis of the pipe to less than the radius of a portion of the bead-like element.

2. A retainer as in claim 1, the second leg portion having a tab portion projecting radially inwardly through the bracket opening of an effective radius from the axis of the pipe less than the radius of the portion of the bead when the second leg portion is in the second position.

3. A retainer as in claim 1, the pipe having a plurality of equally circumferentially spaced beads projecting therefrom, the opening constituting the keyway being defined by circumferentially alternating arcuate portions of the bracket leg portion having radii greater and less respectively than the outer radii of the beads whereby the pipe will slide freely through the opening when the beads and larger radii opening portions are aligned axially while preventing movement of the beads through the opening when the lesser radii portions of the bracket are axially aligned with the bead.

4. A retainer as in claim 3, one of the beads having a circumferential width different than that of the remaining beads, one of the greater radius portions having a circumferential width mating with that of the one bead, the one bead and mating greater radius portion being 180° out of phase in rotative position with respect to each other when in final assembled positions.

* * * * *